US012293120B2

(12) United States Patent
Kumagai

(10) Patent No.: US 12,293,120 B2
(45) Date of Patent: May 6, 2025

(54) DATA PROCESSING DEVICE, IMAGE FORMING DEVICE, CONTROL METHOD THEREFOR, AND NON-TRANSITORY COMPUTER-READABLE STORAGE MEDIUM FOR DISPLAYING INFORMATION BASED ON WHETHER A USER IS PERMITTED TO USE A FUNCTION

(71) Applicant: CANON KABUSHIKI KAISHA, Tokyo (JP)

(72) Inventor: Kanta Kumagai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/936,336

(22) Filed: Sep. 28, 2022

(65) Prior Publication Data

US 2023/0100821 A1 Mar. 30, 2023

(30) Foreign Application Priority Data

Sep. 30, 2021 (JP) ................................. 2021-160998

(51) Int. Cl.
*G06F 3/12* (2006.01)
(52) U.S. Cl.
CPC .......... *G06F 3/1222* (2013.01); *G06F 3/1238* (2013.01); *G06F 3/1292* (2013.01)
(58) Field of Classification Search
None
See application file for complete search history.

(56) References Cited

U.S. PATENT DOCUMENTS

| | | | |
|---|---|---|---|
| 2009/0316206 A1* | 12/2009 | Anezaki | H04N 1/32641 358/1.15 |
| 2015/0092225 A1* | 4/2015 | Kaigawa | G06F 3/1292 358/1.14 |
| 2016/0295057 A1* | 10/2016 | Miyake | H04N 1/32502 |
| 2019/0361650 A1* | 11/2019 | Ren | G06F 3/1204 |

FOREIGN PATENT DOCUMENTS

| | | |
|---|---|---|
| JP | 4869981 B2 | 2/2012 |
| JP | 2017062735 A | 3/2017 |
| JP | 6687786 B2 | 4/2020 |
| WO | WO-2020218098 A1 * 10/2020 | ........... H01M 10/345 |

OTHER PUBLICATIONS

English translation of WO-2020218098-A1. (Year: 2020).*

* cited by examiner

*Primary Examiner* — Thomas D Lee
(74) *Attorney, Agent, or Firm* — Canon U.S.A., Inc. IP Division

(57) ABSTRACT

Embodiments of the disclosure include an image forming device that: receives job information for executing a function of the image forming device from a terminal, the job information including user information; based on the user information included in the received job information, determines whether a user corresponding to the user information is permitted to use a function specified by the job information; in response to a determination that the user is permitted to use the function, executes a job based on the job information; and in response to a determination that the user is not permitted to use the function, notifies the terminal of an error. Using user information included in job information sent from the terminal, whether a corresponding user has the right to execute a job is determined, and if the user has no right, the terminal is notified of an error.

20 Claims, 14 Drawing Sheets

DATA PROCESSING DEVICE, IMAGE FORMING DEVICE, CONTROL METHOD THEREFOR, AND NON-TRANSITORY COMPUTER-READABLE STORAGE MEDIUM FOR DISPLAYING INFORMATION BASED ON WHETHER A USER IS PERMITTED TO USE A FUNCTION

This application claims the benefit of Japanese Patent Application No. 2021-160998, filed Sep. 30, 2021, which is hereby incorporated by reference herein in its entirety.

BACKGROUND

Field of the Disclosure

The present disclosure relates to a data processing system in which a job is executed by wireless communication performed between a data processing device and an image forming device.

Description of the Related Art

In recent years, with the spread of high-performance mobile terminals called smartphones, there have been provided applications for using image forming devices from such mobile terminals. For example, in the execution of the function of sending a scanned original to a specified destination, a mobile terminal searches for an image forming device on a local area network (LAN), adds the e-mail address of a user-set destination and various types of scan setting information (such as color and double-sided) to image data, and generates it as job information. The mobile terminal sends the generated job information to the image forming device found by the search, which has the sending function, and the image forming device executes a job based on the received job information. Instructions to execute a series of processes of the image forming device that are necessary for executing the job as described above may be given from the mobile terminal. In addition, by saving a user's desired job information in the mobile terminal and invoking the saved job information, various image forming devices may be easily caused to execute desired jobs.

The administrator of an image forming device may restrict the functions of the image forming device that are available on a user-by-user basis. Japanese Patent Laid-Open No. 2017-062735 discloses a method of, in the case where such usage restrictions are provided, sending job information from a user's terminal to an image forming device. When the terminal communicates with the image forming device in advance and obtains information on usage restrictions, the method allows the icons of functions that are not available for the user to be displayed differently from other functions on the menu screen of the terminal, thereby disabling the user from using the corresponding functions.

Since functions available for the user may differ from one image forming device to another, in the method of Japanese Patent Laid-Open No. 2017-062735, before selecting a function to use, the user needs to establish communication between the terminal and the image forming device and to obtain information on usage restrictions and the like. However, as described above, there are cases where the user selects a function, configures settings of a job, and then selects an image forming device to which job information is to be sent, such as the case of saving desired job information in the terminal and using the saved job information in various image forming devices. In the method of Japanese Patent Laid-Open No. 2017-062735, the user needs to select an image forming device before selecting a function, and there is a possibility that the above case cannot be handled and the usability is lowered.

SUMMARY

Embodiments of the present disclosure provide a method of preventing the lowering of the usability even in the case where a job execution instruction is given from a terminal to an image forming device where the usage of functions is restricted.

An image forming device includes a memory and at least one processor in communication with the memory. The at least one processor of the image forming device is configured to perform: receiving job information for executing a function of the image forming device from a terminal, the job information including user information; based on the user information included in the received job information, determining whether a user corresponding to the user information is permitted to use a function specified by the job information; in response to a determination in the determining that the user is permitted to use the function, executing a job based on the job information; and in response to a determination in the determining that the user is not permitted to use the function, notifying the terminal of an error.

Further features of the present disclosure will become apparent from the following description of exemplary embodiments with reference to the attached drawings.

DESCRIPTION OF THE EMBODIMENTS

Hereinafter, embodiments of the present disclosure will be described using the drawings. Note that elements described in the embodiments are only illustrative and are not intended to limit the scope of the present disclosure only thereto. The following description is given using an image forming device as an example of an information processing device, but this is not the only possible kind of information processing device.

First Embodiment

Figure 1:
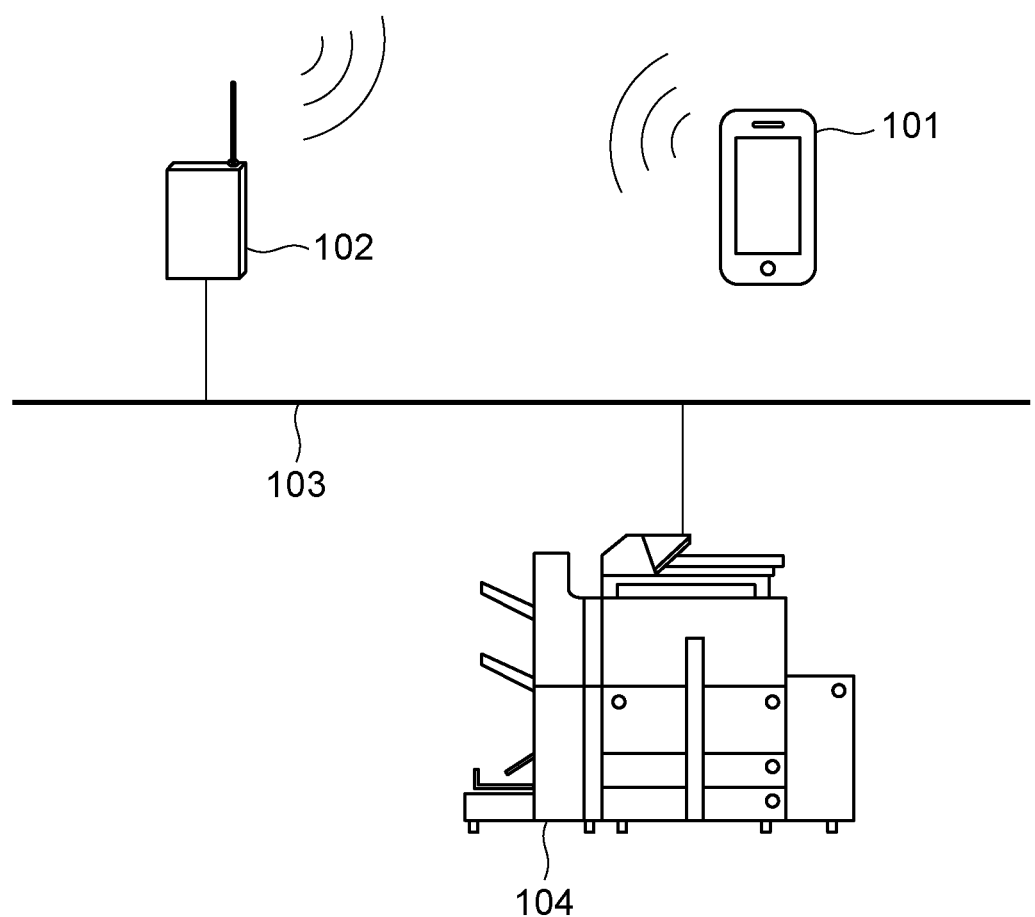
FIG. 1 is a diagram illustrating the configuration of a data processing system.

FIG. 1 is a diagram illustrating the configuration of a data processing system according to a first embodiment. A data processing system 100 includes a data processing device 101, a wireless local area network (LAN) terminal 102, and an image forming device 104, and these devices are interconnected via a network 103 such as a LAN. Devices other than those indicated herein may be connected to the network 103.

The data processing device 101 is, for example, a mobile terminal such as a smartphone, and may be an information processing device in which an operating system for a small terminal and programs for controlling voice calls, location detection, and data communication run. Alternatively, the data processing device 101 may be a personal computer (PC) not equipped with functions such as voice call control, location detection control, and the like. The data processing device 101 is connected to the network 103 also by the wireless LAN terminal 102.

The wireless LAN terminal 102 is a wireless LAN master unit having a general network router function, and provides a wireless LAN at home, office, etc.

The image forming device 104 is a multifunctional peripheral (MFP) equipped with various functions such as a printer function, a copy function, a scanner function, and a fax sending function. However, the image forming device 104 is not limited to the above, and may be a device that only has a single function. The image forming device 104 may be configured to include a wireless access point internally and may be configured to be able to communicate directly with the data processing device 101. A user can instruct the image forming device 104 to execute a job from the data processing device 101 that is in communication with the image forming device 104, thereby executing various functions of the image forming device 104. Although the image forming device 104 is connected by wire to the network 103 in the present embodiment, like the data processing device 101, the image forming device 104 may be connected wirelessly using the wireless LAN terminal 102.

Furthermore, the data processing device 101 and the image forming device 104 can perform short-range wireless communication using near-field communication (NFC), Bluetooth Low Energy (BLE) (registered trademark), or the like. The image forming device 104 sends connection information (Internet Protocol (IP) address, media access control (MAC) address, service set identifier (SSID), etc.) for establishing a wireless LAN connection with the image forming device 104 via an NFC communication unit or a BLE communication unit, which will be described later, to the data processing device 101. Using the obtained connection information, the data processing device 101 starts wireless LAN communication with the image forming device 104.

Figure 2:
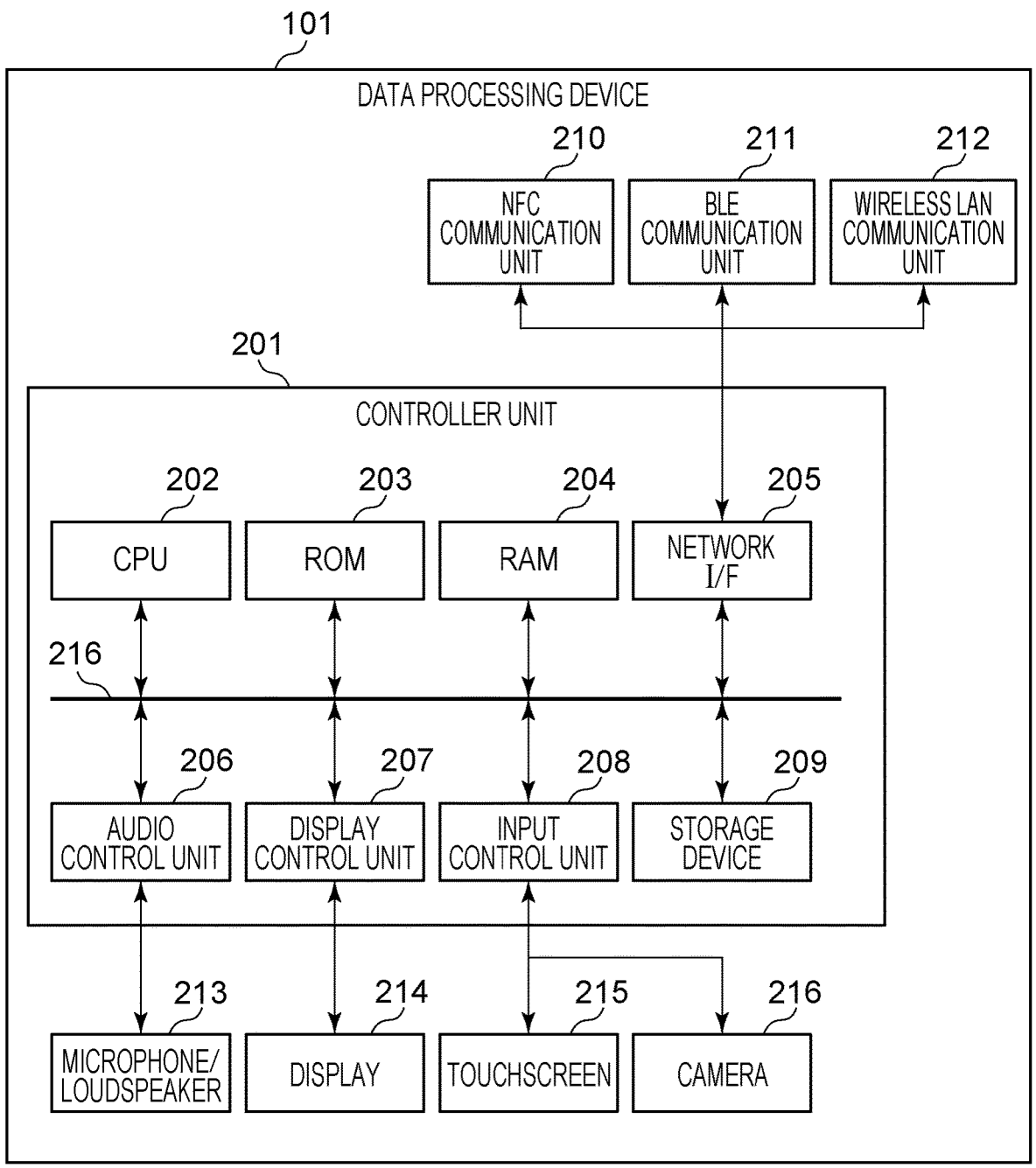
FIG. 2 is a block diagram illustrating the hardware configuration of a data processing device.

FIG. 2 is a hardware configuration diagram of the data processing device 101 according to the present embodiment. The data processing device 101 includes a controller unit 201. The controller unit 201 controls various communication units such as an NFC communication unit 210, a BLE communication unit 211, and a wireless LAN communication unit 212, and various user interface (UI) units such as a microphone/loudspeaker 213, a display 214, a touchscreen 215, and a camera 216.

The controller unit 201 includes a central processing unit (CPU) 202, a read-only memory (ROM) 203, a random-access memory (RAM) 204, a network interface (I/F) 205, an audio control unit 206, a display control unit 207, an input control unit 208, and a storage device 209, which are connected by a system bus 216.

The CPU 202 controls the entire system of the data processing device 101. The ROM 203 stores the operating system of the data processing device 101 and programs for controlling voice calls, data communication, and the like, and the CPU 202 executes various programs. The RAM 204 is used as a temporary storage area such as the main memory, work area, and the like for the CPU 202.

The storage device 209 is a non-volatile storage device, and records various operation mode settings, operation logs, and the like that need to be maintained even after the data processing device 101 is restarted.

The network I/F 205 is connected to the NFC communication unit 210, the BLE communication unit 211, and the wireless LAN communication unit 212, and exchanges data with the image forming device 104 using various types of wireless communication.

The audio control unit 206 performs input/output control of audio data via the microphone/loudspeaker 213. The display control unit 207 performs output control of a screen displayed on the display 214. The input control unit 208 performs input control of information designated by the user via a button or the touchscreen 215. Various applications executed by the data processing device 101 use the audio control unit 206, the display control unit 207, the input control unit 208, and the like.

Figure 3:
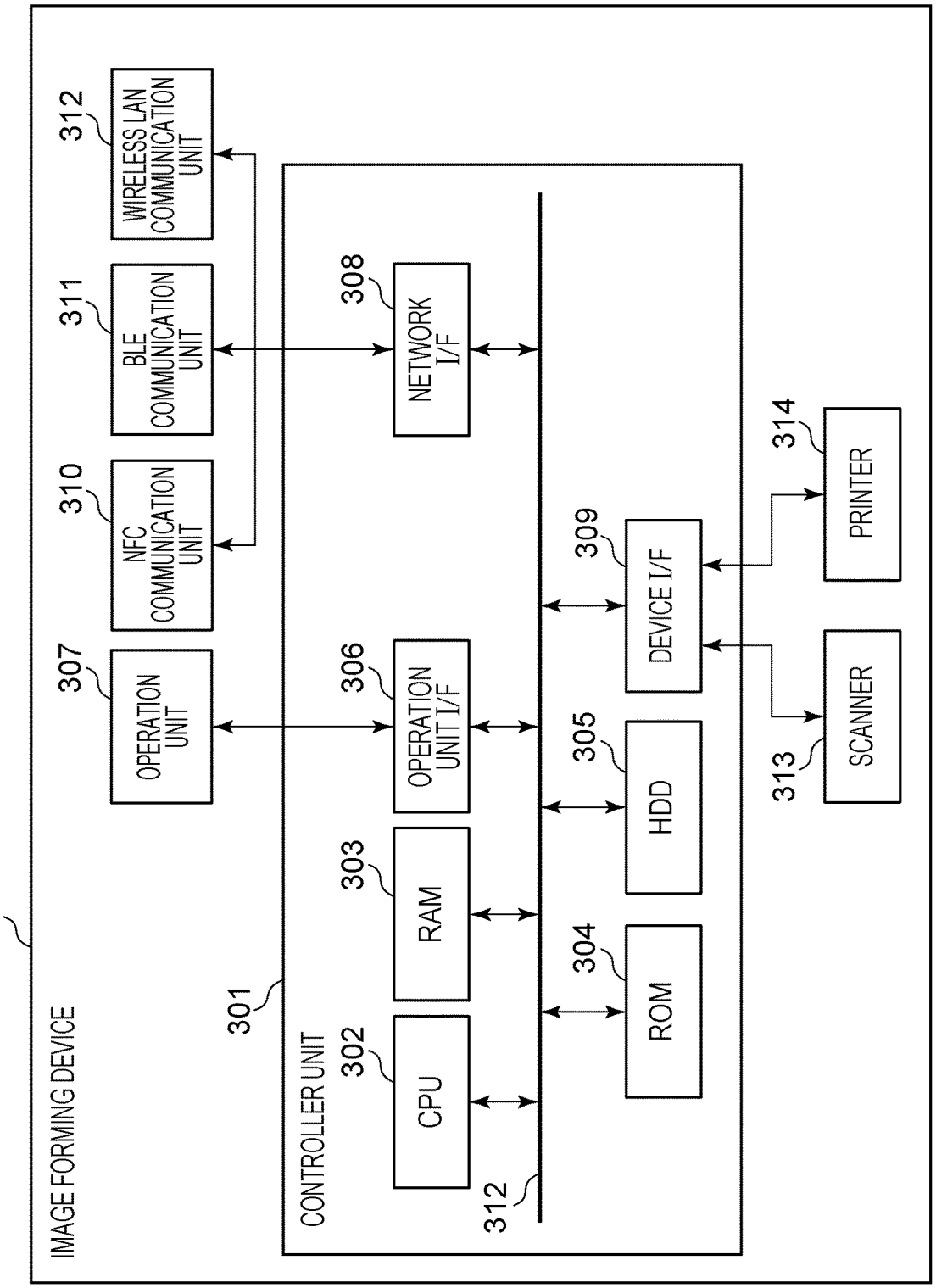
FIG. 3 is a block diagram illustrating the hardware configuration of an image forming device.

FIG. 3 is a hardware configuration diagram of the image forming device 104 according to the present embodiment. The image forming device 104 includes a controller unit 301, and the controller unit 301 controls various communication units such as an NFC communication unit 310, a BLE communication unit 311, and a wireless LAN communication unit 312, an operation unit 307, a scanner 313, and a printer 314. In the case where the user uses the copy function of the image forming device 104, the controller unit 301 controls the scanner 313 to obtain the image data of an original, and controls the printer 314 to print and output an image on paper. In addition, in the case where the user uses the scan and send function, the controller unit 301 controls the scanner 313 to obtain the image data of an original, and convert the image data to code data. Then, the code data is sent to the data processing device 101 or the like via a network I/F 308. Moreover, in the case where the user uses the print function, the controller unit 301 receives image data (code data) from the data processing device 101 via the network I/F 308. The controller unit 301 sends the received image data to the printer 314. On the basis of the received image data, the printer 314 prints and outputs an image on paper. The image forming device 104 also has a fax reception function of receiving data from Integrated Services Digital Network (ISDN) or the like and printing the received data, and a fax sending function of sending scanned data to ISDN or the like. In order to execute each of the functions as mentioned above, a to-be-processed task set by the user is referred to as a job, and the image forming device 104 executes a certain job in accordance with job information.

The controller unit 301 includes a CPU 302, a RAM 303, a ROM 304, a hard disk drive (HDD) 305, an operation unit I/F 306, the network I/F 308, and a device I/F 309, which are connected by a system bus 315.

The CPU 302 controls the entire system of the image forming device 104. The RAM 303 is a system work memory for the CPU 302 to operate, and temporarily stores image data and the like.

The RAM 303 also stores scanned image data read by the scanner 313, and print image data received from the data processing device 101 via the network 103.

The ROM 304 stores a system boot program, applications, and the like. The HDD 305 stores an operating system, system software, application software, image data, setting data, and the like.

The operation unit 307 displays information to the user and accepts operations from the user.

The operation unit 307 includes, for example, an operation panel such as a touchscreen display.

The operation unit I/F 306 outputs information to be displayed on the operation unit 307 to the operation unit 307.

The operation unit I/F 306 also accepts information entered by the user from the operation unit 307. The network I/F 308 is connected to the NFC communication unit 310, the BLE communication unit 311, and the wireless LAN communication unit 312, and exchanges information with the data processing device 101 and a cloud server 105 using various types of communication. The wireless LAN communication unit 312 performs wireless LAN communication with the data processing device 101 via the network 103. In addition, the NFC communication unit 310 and the BLE communication unit 311 perform short-range wireless communication with the data processing device 101. The image forming device 104 receives a job's setting information, image data, a job execution command, and the like from the data processing device 101 via the network I/F 308, and executes the job. The device I/F 309 connects the scanner 313 and the printer 314, which execute reading and printing of image data, and the controller unit 301, and inputs/outputs image data.

Figure 4:
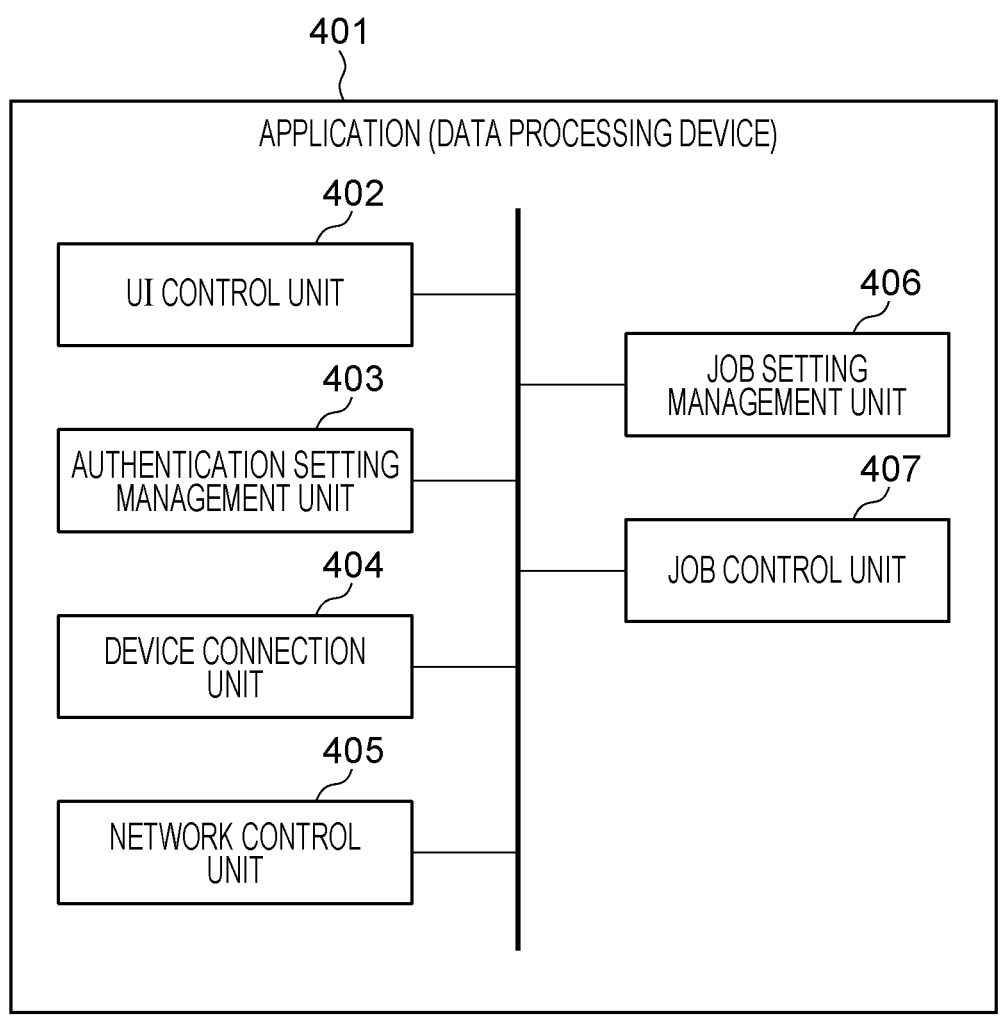
FIG. 4 is a block diagram illustrating the software configuration of the data processing device.

FIG. 4 illustrates the software configuration of the data processing device 101 according to the present embodiment. FIG. 4 is a functional block diagram of software realized when the CPU 202 reads a control program stored in the ROM 203 or the storage device 209.

An application 401 is an application installed in the data processing device 101 and is an application for causing the image forming device 104 to operate. Print job information or scan job information can be generated by configuring settings on the application 401, and the job information can be sent to the image forming device 104. Besides the application 401, various applications are installed in the data processing device 101, but the description thereof is omitted. The configuration of the application 401 will be discussed below.

A UI control unit 402 accepts job setting information and the like entered by the user on the touchscreen 215, and sends the received contents to a job setting management unit 406 and a job control unit 407 via the input control unit 208. In addition, the UI control unit 402 receives responses from the job setting management unit 406 and the job control unit 407, and outputs a screen in accordance with the received contents to the display 214 via the display control unit 207. Furthermore, the UI control unit 402 accepts authentication information for logging in to the image forming device 104, such as user information and a password entered by the user on the touchscreen 215, and sends the authentication information to an authentication setting management unit 403 via the input control unit 208.

The authentication setting management unit 403 registers the authentication information such as the user information and the like received from the UI control unit 402. On the basis of the registered authentication information, the authentication setting management unit 403 performs a process of logging in to the image forming device 104. Specifically, the authentication information is passed to a network control unit 405. The authentication information is sent to the image forming device 104 via the network 103. Using the received authentication information, the image forming device 104 performs a login process and returns the result to the data processing device 101. The registered authentication information may also be included in job information, and, by sending job information including the authentication information to the image forming device 104, the user can automatically log in to the image forming device 104.

A device connection unit 404 establishes short-range wireless communication using, for example, NFC or BLE, and/or wireless LAN communication via the network 103 between the data processing device 101 and the image forming device 104. For example, in the case of NFC, short-range wireless communication is started when the user brings the NFC communication unit 210 of the data processing device 101 and the NFC communication unit 310 of the image forming device 104 closer to each other. In the case of BLE, the BLE communication unit 311 of the image forming device 104 sends a BLE beacon, and the BLE communication unit 211 of the data processing device 101 receives the sent beacon. In response to a determination that the radio wave intensity of the beacon received by the data processing device 101 has become a certain level or greater when the user brings the data processing device 101 closer to the image forming device 104, short-range wireless communication is started. As described above, when the user brings the NFC or BLE communication units of the data processing device 101 and the image forming device 104 closer to each other, the device connection unit 404 performs short-range wireless communication with the image forming device 104. Then, the device connection unit 404 obtains, via the short-range wireless communication, device information including connection information necessary for wireless LAN communication from the image forming device 104. Using the obtained connection information, the device connection unit 404 starts wireless LAN communication with the image forming device 104 via the network 103.

The network control unit 405 sends job information (such as setting information, a job execution instruction command, image data, and user authentication information) to the image forming device 104 via the network 103. In the case of configuring job information for sending scanned image data to a set destination, the job setting information includes a destination to which the data is to be sent, settings related to a scan, and the like. Furthermore, the network control unit 405 can also receive job setting information and the like stored in the image forming device 104 via the network 103.

The job setting management unit 406 stores job setting information which has been entered by the user and accepted by the UI control unit 402, and/or job setting information received from the image forming device 104 by the network control unit 405 in the RAM 204 or the storage device 209. At this time, the job setting management unit 406 may register these items of job setting information as "favorites" that are settings that the user often uses. In addition, the job setting management unit 406 may register certain job setting information as "presets" at the time the application 401 is installed.

The job control unit 407 controls a process executed by the image forming device 104. For example, the job control unit 407 generates job information from job setting information included in the "favorites" or "presets" registered in the job setting management unit 406 or job setting information set by a user operation, and sends a job execution instruction for the image forming device 104 via the network 103. Moreover, the job control unit 407 obtains a job execution status and the device operating state of the scanner 313 and the printer 314 from the image forming device 104 via the network 103, and sends the obtained information to the UI control unit 402.

Figure 5:
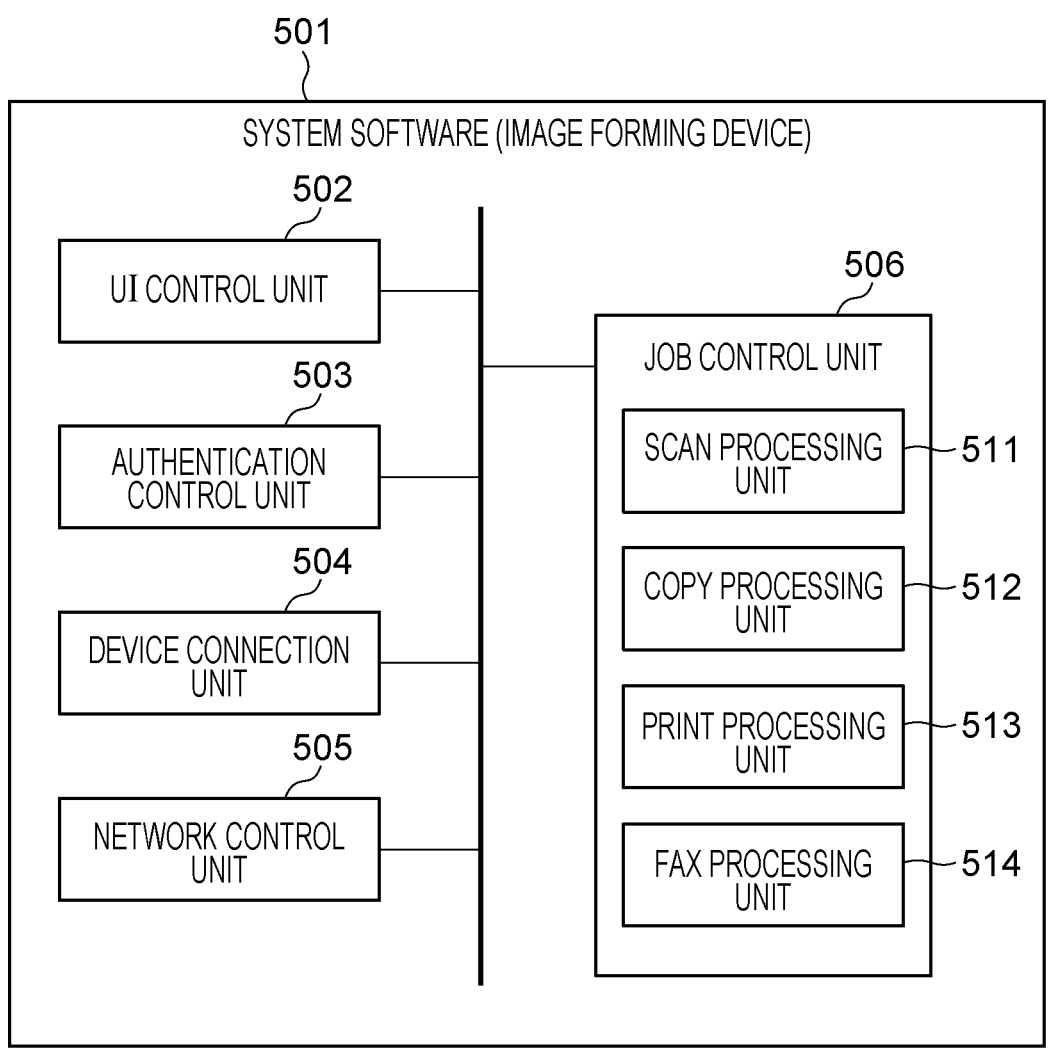
FIG. 5 is a block diagram illustrating the software configuration of the image forming device.

FIG. 5 illustrates the software configuration of the image forming device 104 according to the present embodiment. FIG. 5 is a functional block diagram of software realized when the CPU 302 reads a control program stored in the ROM 304 or the HDD 305.

System software 501 is software executed by the CPU 302 of the image forming device 104, and is stored in the RAM 303, the HDD 305, or the like.

A UI control unit 502 accepts job setting information and the like entered by the user on the operation unit 307, and sends the accepted information to a job control unit 506. In addition, the UI control unit 502 receives a response from the job control unit 506, and outputs information to the operation unit 307. It is assumed that the operation unit 307 here also includes a display unit.

An authentication control unit 503 performs authentication of the user. For example, the authentication control unit 503 performs a user identification and user authentication process based on authentication information received from the data processing device 104, and returns the result.

A device connection unit 504 performs short-range wireless communication or establishes wireless LAN communication via the network 103 between the data processing device 101 and the image forming device 104.

A network control unit 505 receives job setting information, image data, user information, and the like from the data processing device 101 via the network 103. Furthermore, the network control unit 505 sends job setting information stored in the image forming device 104 to the data processing device 101 via the network 103.

The job control unit 506 controls processing units such as a scan processing unit 511, a copy processing unit 512, a print processing unit 513, and a fax processing unit 514 according to the received job information, and executes various jobs. At this time, the job control unit 506 executes a job based on job setting information set by the user using the operation unit 307. Furthermore, the job control unit 506 receives a job execution request received from the data processing device 101 via the network 103, and executes various jobs according to setting information and the like of the received job information. Moreover, the job control unit 506 sends a job execution status and the device operating state of the scanner 313 and the printer 314 to the data processing device 101 via the network 103.

Figure 11:
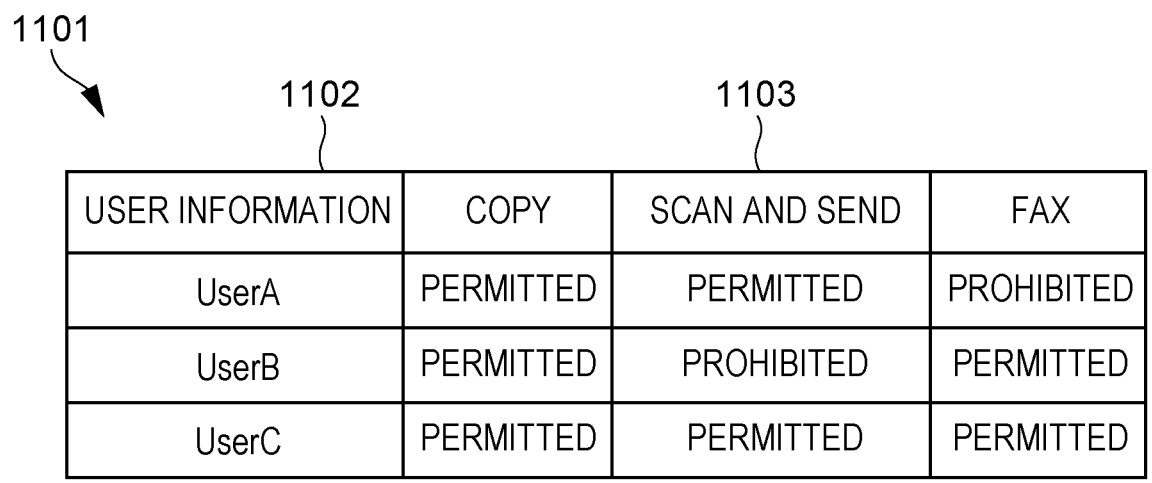
FIG. 11 is a diagram illustrating an example of user information and function usage restriction information managed by the image forming device.

Furthermore, the job control unit 506 can also restrict the functions available for the user based on a usage right management table illustrated in FIG. 11. For example, the administrator can configure settings to provide usage restrictions of the functions of the image forming device 104.

A usage right management table 1101 of FIG. 11 is a table that manages the usage restriction of each function on a user-by-user basis, and the usage "permission" or "prohibition" of each function is set on a user-by-user basis. User information is indicated in column 1102, and a function is indicated in column 1103. For example, "User A" is permitted to use the "copy" and "scan and send" functions, but is not permitted to use the "fax" function. In this manner, the administrator can restrict the functions that are available on a user-by-user basis.

FIGS. 8A to 8E illustrate exemplary screens displayed on the display 214 by the application 401 of the data processing device 101.

Figure 8A:
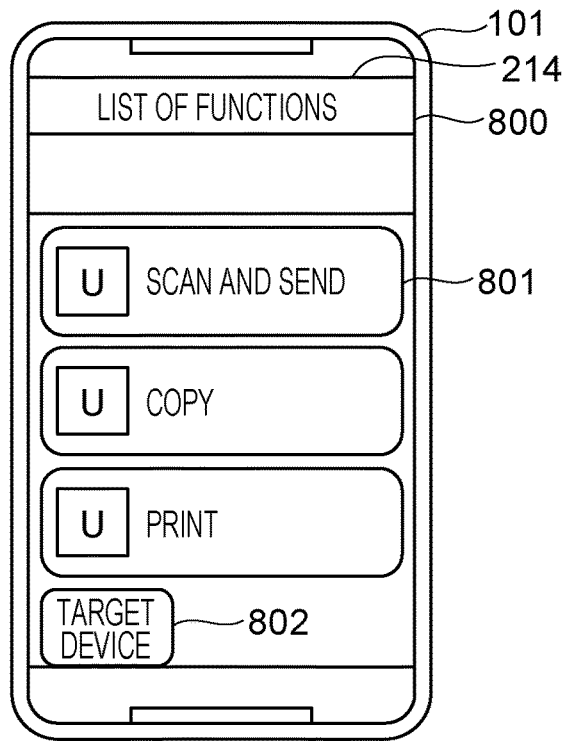
FIGS. 8A to 8E are diagrams illustrating exemplary screens displayed by the data processing device.

FIG. 8A illustrates a menu screen of the application 401. A menu screen 801 is an initial screen displayed when the application 401 is launched, and the user selects a desired function from the menu screen 801. A target device area 802 is an area where information on an information processing device to which the application 401 sends job information is displayed, and, when the target device area 801 is pressed, an image forming device serving as a target can be selected. Selection of an image forming device is not always required here.

When a "scan and send" button 801 is pressed, a "scan and send" function screen 803 is displayed.

Figure 8B:
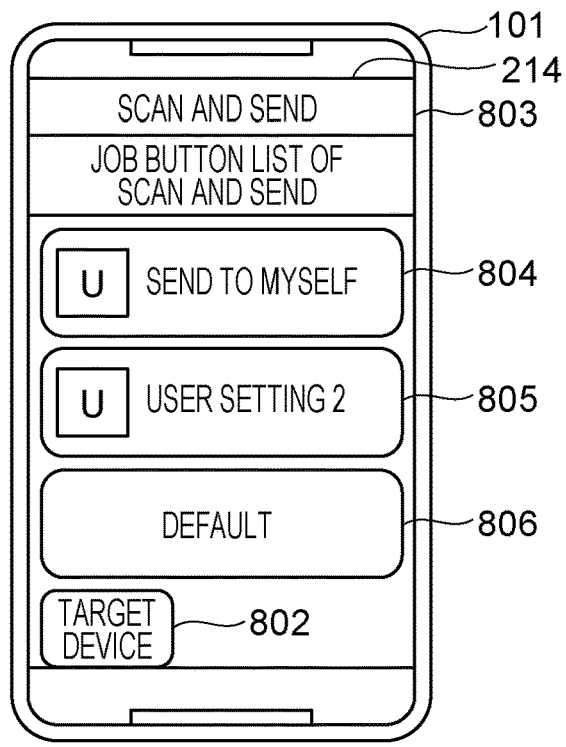

FIG. 8B illustrates the "scan and send" function screen 803 of the application 401.

The "scan and send" function screen 803 includes buttons 804 to 806 for invoking certain set values and the "scan and send" setting screen 803. The "send to myself" button 804 and the "user setting 2" button 805 are "favorites" buttons where the user has set in advance desired set values. A "favorites" button can be added by selecting an add button. A default button 806 is a "presets" button for invoking default set values. Selection of an image forming device is not always required here.

Figure 8C:
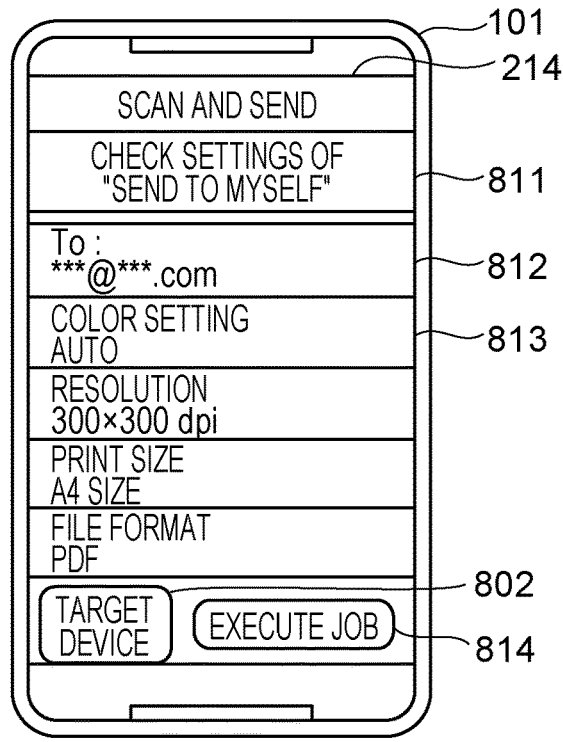

FIG. 8C illustrates a "send to myself" setting screen 811. The "send to myself" setting screen 811 is a screen displayed when the "send to myself" button 804 is selected. A set destination is displayed in a destination area 812, and, when the destination area 812 is pressed, a destination can be set. A scan setting area 813 includes various setting buttons for a scan process, and, when the user presses each button, each setting can be configured. Selection of a target image forming device is required here. When an execute button 814 is pressed, job information is sent to the target image forming device. The image forming device that has received the job information performs later-described PIN code authentication, performs a scan based on the set scan settings, and then sends image data generated by the scan to the set destination.

Figure 8D:
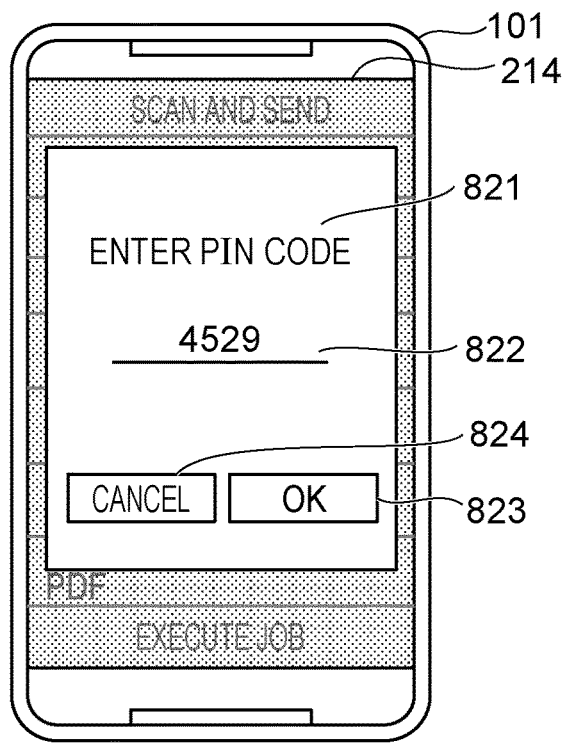

FIG. 8D illustrates a PIN code entry screen 821. The PIN code entry screen 821 is a screen for entering a PIN code included in a PIN code screen 1001 displayed on the image forming device 104 after the "scan and send" job information is sent to the image forming device 104. A PIN code entry field 822 is an entry field for entering a PIN code. A cancel button 824 is a button for cancelling the job. An OK button 823 is a button for sending the PIN code entered in the PIN code entry field 822 to the image forming device 104. Instead of the PIN code, QR code (registered trademark) may be displayed on the image forming device 104, and the QR code may be read with the camera 216 of the data processing device 101, thereby sending authentication information. The image forming device 104 performs authentication based on the received PIN code, and, when the authentication is successful, executes a job based on the received job information.

Figure 8E:
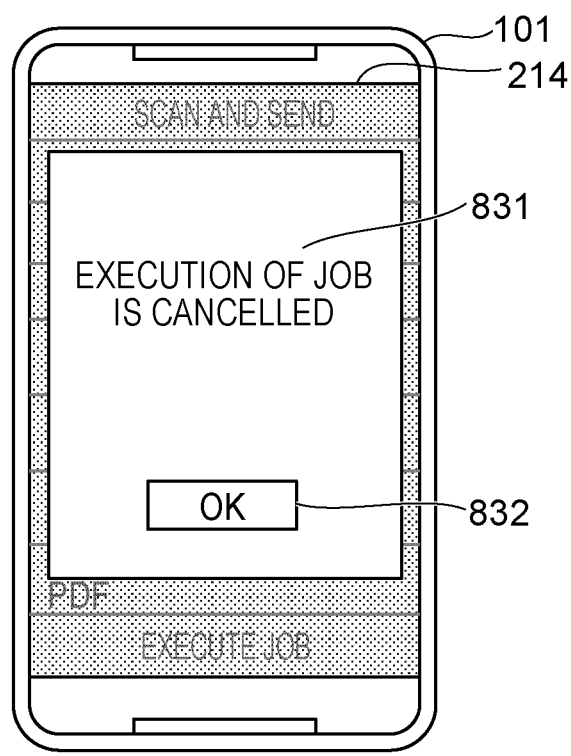

FIG. 8E illustrates a job error screen 831. The job error screen 831 is a screen displayed when a job error occurs after the application 401 sends job information to the image forming device 104. For example, when a user who is restricted to using the "scan and send" function of the image forming device 104 gives an instruction to send the "scan and send" job information from the application 401, the job error screen 831 is displayed because the job cannot be executed by the image forming device 104. When an OK button 832 is pressed, the job error screen 831 returns to the "send to myself" setting screen 811 or the menu screen 801. The job error screen 831 may display contents of the error.

Figure 6:
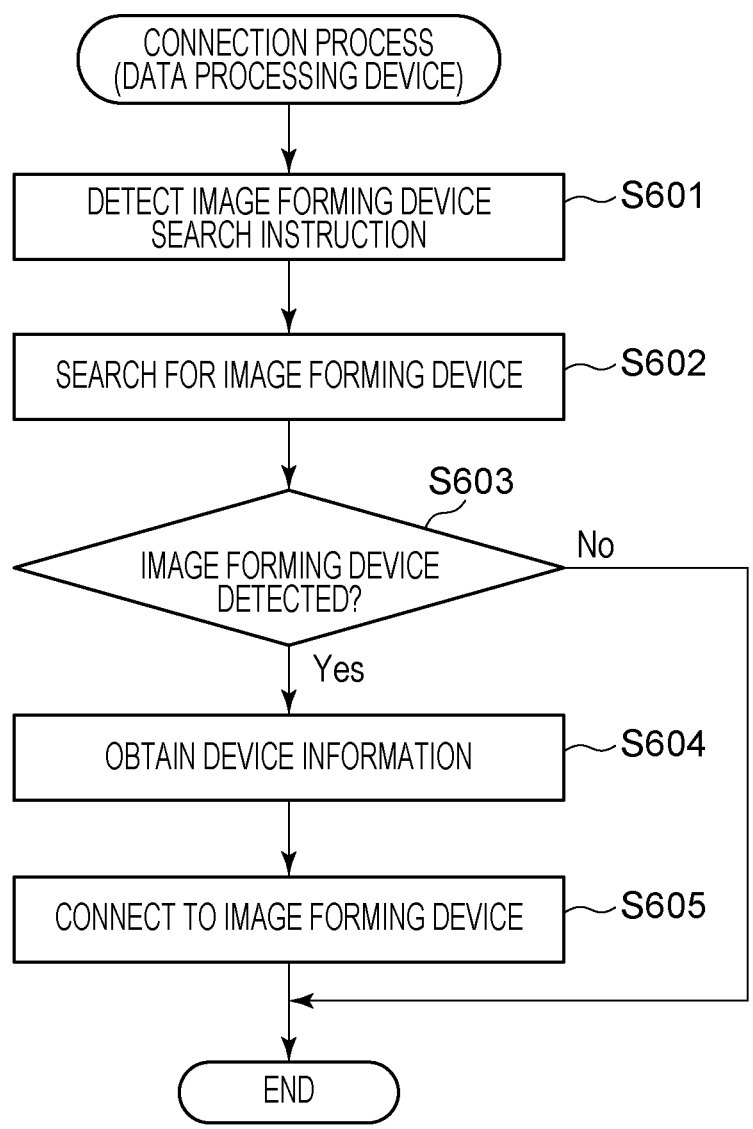
FIG. 6 is a flowchart illustrating a connection process performed by the data processing device in a first embodiment.

FIG. 6 is a flowchart illustrating a process performed by the data processing device 101 to connect with the image forming device 104 in the present embodiment. The flowchart of FIG. 6 is realized by reading a program for realizing each control module stored in the ROM 203 or the storage device 209 by the CPU 202 of the data processing device 101 into the RAM 204 and executing the program. Note that the process of this flowchart starts when, for example, the target device area 802 is pressed by the user.

In step S601, the UI control unit 402 detects an instruction from the user for searching for an image forming device.

In step S602, the device connection unit 404 searches for an image forming device which is present on the network 103 via the wireless LAN terminal 102 using Wi-Fi (registered trademark) or the like, and which is the image forming device 104 supported by the application 401.

In step S603, the device connection unit 404 ends the process if no image forming device is detected as a result of the search in step S602, or obtains device information if an image forming device is detected (S604). Alternatively, connection information such as an IP address may be obtained by performing short-distance wireless communication with NFC or BLE of the image forming device 104, and, based on the obtained connection information, the image forming device 104 may be searched for and its device information may be obtained. Here, the device information is identification information such as the MAC address or the device name of the image forming device, but may include capability information such as color information, supported format information, and the like.

In step S605, the device connection unit 404 starts connecting with the image forming device 104 using the obtained device information, and ends the process.

The data processing device 101 which has started connecting with the image forming device 104 can use the application 401 to instruct the image forming device 104 to execute jobs such as copying, printing, or sending a scanned image.

Since a search for an image forming device is conducted at the time the target device area 802 is pressed, it is also possible to configure settings of a job in advance on the "send to myself" setting screen 811 or the like on the application 401, and then to select an image forming device to which job information is to be sent. In other words, the device to which job information is to be sent can be determined after selecting the function to use. Accordingly, the time spent communicating with the image forming device can be reduced.

FIGS. 10A to 10D illustrate exemplary screens displayed by the image forming device 104 on the operation unit 307.

Figure 10A:
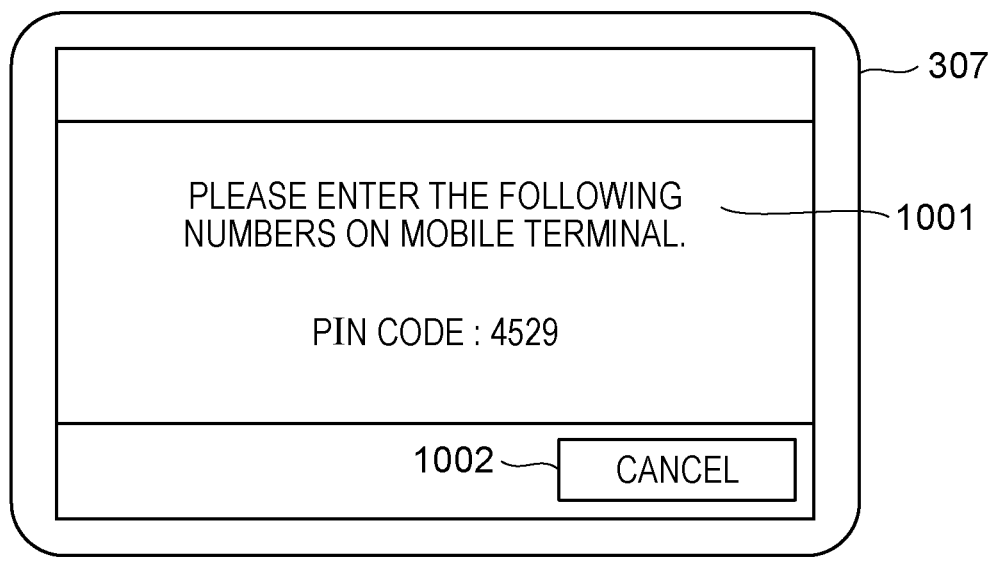
FIGS. 10A to 10D are diagrams illustrating exemplary screens displayed by the image forming device.

FIG. 10A illustrates the PIN code screen 1001. The PIN code screen 1001 is a screen displayed when, for example, the "scan and send" job information is received from the data processing device 101. In order to ensure that the user of the data processing device 101 is in front of the image forming device 104, the user is prompted to enter the PIN code displayed on the PIN code screen 1001 using the data processing device 101. A cancel button 1002 is a button for cancelling the job.

Figure 10B:
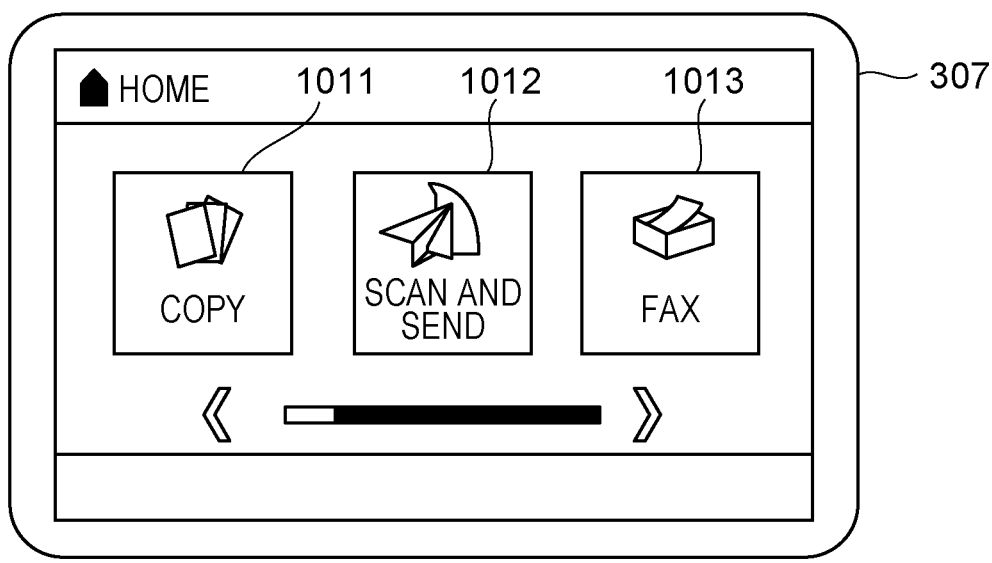

FIG. 10B illustrates a home screen 1010. The home screen 1010 is a screen displayed when, for example, authentication based on user information entered on a login information entry screen (not illustrated) is successful and the user logs in to the image forming device 104.

The home screen 1010 is a screen that displays a list of functions of the image forming device 104, and is a screen where the user selects the function that the user wants to use. A copy button 1011 is a button for executing the copy function, and, when the copy button 1011 is pressed, the home screen 1010 transitions to a copy setting screen (not illustrated). A "scan and send" button 1012 is a button for executing the function of sending a scanned image to a set destination. When the "scan and send" button 1012 is pressed, the home screen 1011 transitions to a "scan and send" setting screen 1020. A fax button 1013 is a button for executing the fax function, and, when the fax button 1013 is pressed, the home screen 1010 transitions to a fax setting screen (not illustrated).

Figure 10C:
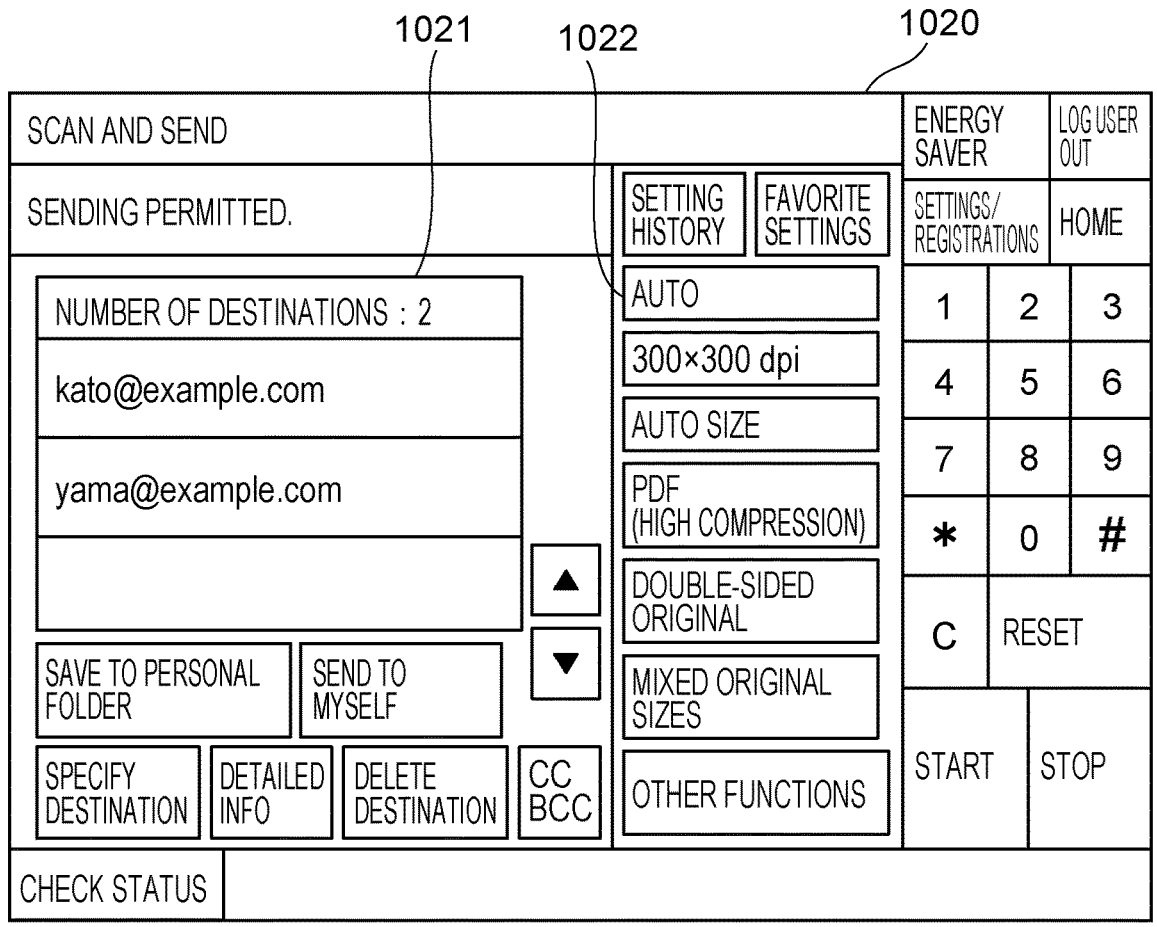

FIG. 10C is a screen illustrating the "scan and send" function of the image forming device 104. The "scan and send" setting screen 1020 is a screen for setting a scan and an image sending destination. In a destination field 1021, the set destination is displayed. A scan setting area 1022 is an area for configuring settings of a scan, and pressing of each button allows each setting to be configured. When a start button is pressed, a process is executed with the contents set on the "scan and send" setting screen 1020.

Figure 10D:
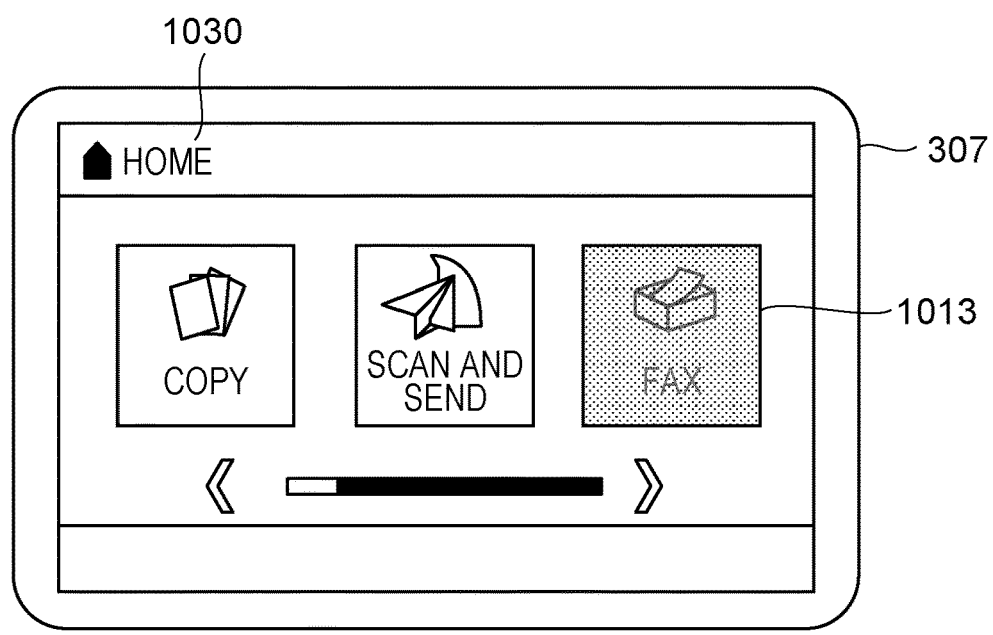

FIG. 10D illustrates an exemplary home screen in the case where a function usage restriction is set. Here, a home screen 1030 displayed when "User A" indicated in FIG. 11 logs in is discussed.

"User A" is permitted to use the "copy" and "scan and send" functions, but is not permitted to use the "fax" function, and accordingly, a fax button 1013 is grayed out. Accordingly, "User A" is unable to select the fax button 1013 to use the fax function.

When the image forming device 104 receives the "scan and send" job information from the data processing device 101, the image forming device 104 first displays the PIN code screen 1001. It is assumed that, if the PIN code entered on the data processing device 101 is correct, a local login is performed using user information included in the received job information, and the "scan and send" setting screen 1020 or the like is displayed to execute the "scan and send" job. Here, a local login is a login for the user to occupy the operation on the operation panel of the image forming device 104. For example, the user is prompted to enter user information or the like on the operation panel of the image forming device 104, and authentication is performed to enable the user to access various resources. While the user is logged in locally, other users are not allowed to log in locally or operate the operation panel. Hereinafter, a "login" refers to a local login unless otherwise noted.

Here, "User B" indicated in FIG. 11 is prohibited from using the "scan and send" function. When "User B" sends the "scan and send" job information to the image forming device 104 using the application 401, because "User B" logs in to the image forming device 104 after entering a PIN code, it is determined that the job cannot be executed after the login, resulting in an error. This is annoying because the user is required to enter an unnecessary PIN code. Therefore, in the present embodiment, the user can be notified of an error due to a usage restriction before logging in and being requested to enter a PIN code.

Figure 7:
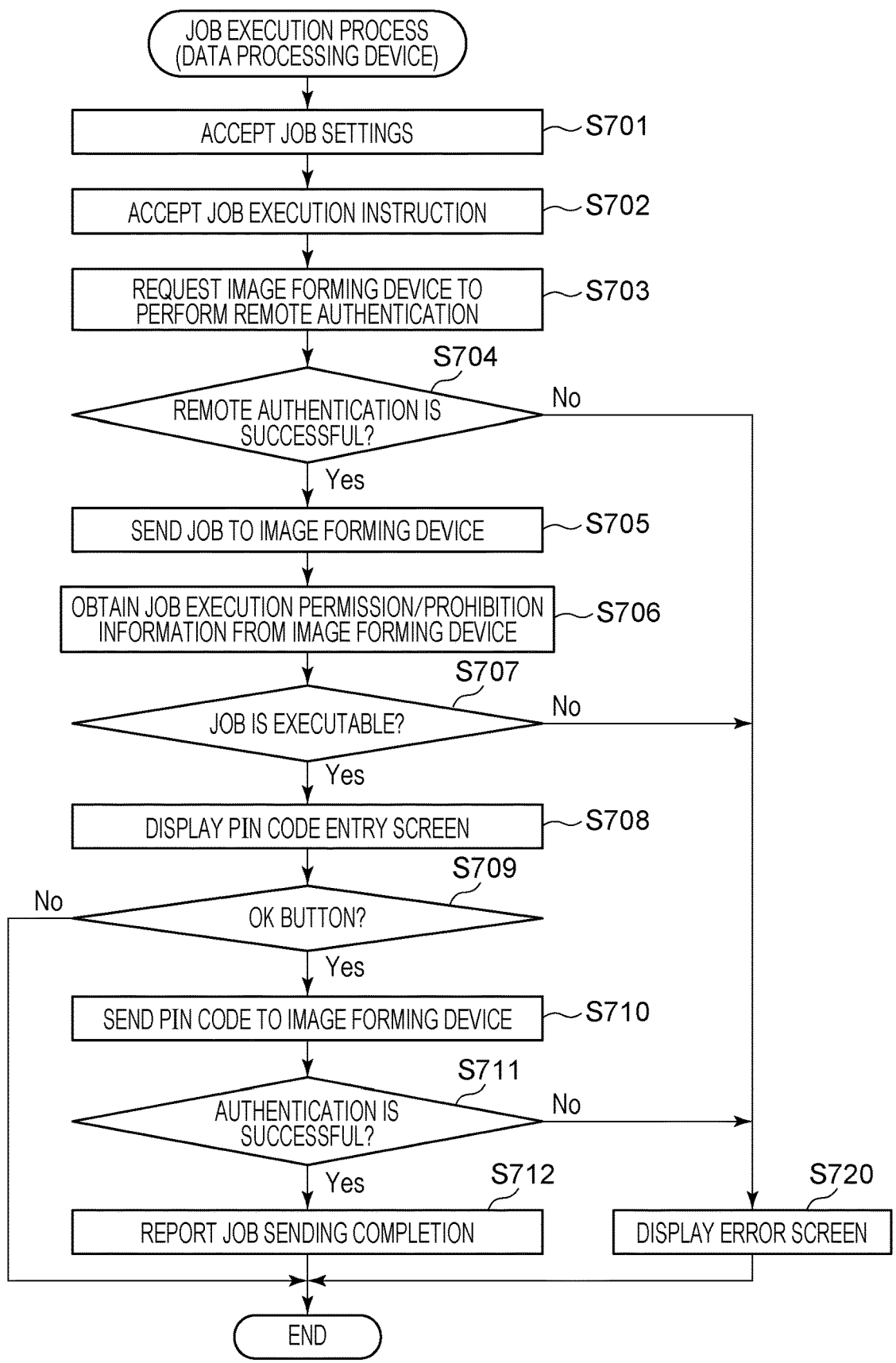
FIG. 7 is a flowchart illustrating a job execution process performed by the data processing device in the first embodiment.

A job execution instruction process executed by the data processing device 101 in the present embodiment will be described using FIG. 7. FIG. 7 is a flowchart illustrating the job execution instruction process, which is realized by reading a program for realizing each control module stored in the ROM 203 or the storage device 209 by the CPU 202 of the data processing device 101 into the RAM 204 and executing the program.

In step S701, the UI control unit 402 accepts job settings from the user. For example, settings related to a scan and a destination are accepted on the "send to myself" setting screen 811.

In step S702, the UI control unit 402 accepts an instruction from the user to send job information. Specifically, pressing of the execute button 814 is accepted.

In step S703, the device connection unit 404 obtains user information, such as a user name and a password saved in the authentication setting management unit 403, and requests the image forming device 104 to perform remote authentication. The user information obtained here is included in job information, which will be described later. The image forming device 104 that makes a remote authentication request has been connected by the connection process of FIG. 6. The remote authentication is authenticating whether to permit communication between the data processing device 101 and the image forming device 104 to be started. Upon successful authentication, the image forming device 104 becomes ready to receive job information from the data processing device 101.

In step S704, the device connection unit 404 determines whether the remote authentication is successful. If the remote authentication is successful, the process proceeds to S705, and if not, the process proceeds to step S720 to display an error screen (such as the job error screen 831). The determination of whether the remote authentication is successful is determined based on a response sent from the image forming device 104.

In step S705, the job control unit 407 sends job information to the image forming device 104. The job information includes setting information, user information, and information indicating the function to use, which are accepted on the setting screen 811.

In step S706, the job control unit 407 obtains from the image forming device 104 whether a job sent in step S705 can be executed. The image forming device 104 refers to, for example, the usage right management table 1101 of FIG. 11, and specifies one or more functions that are available for a user corresponding to user information included in the received job information. Then, it is determined whether a function corresponding to the job information is available.

In step S707, if the function can be executed based on the job execution permission/prohibition information obtained in step S706, the job control unit 407 proceeds to S708; and if not, the job control unit 407 proceeds to S720 to display an error screen.

In step S708, the UI control 402 displays the PIN code entry screen 821 on the display 214 to accept a PIN code entry from the user.

In step S709, the UI control unit 402 determines whether pressing of the OK button 823 by the user has been accepted. If pressing of the OK button 823 has been accepted, the process proceeds to S710, and if pressing of the cancel button 824 has been accepted, the process ends.

In step S710, the device connection unit 404 sends a PIN code accepted on the PIN code entry screen 821 to the image forming device 104.

In step S711, the job control unit 407 obtains information indicating whether authentication based on the sent PIN code is successful from the image forming device 104. If the authentication is successful, the process proceeds to S712, and if not, the process proceeds to S720.

In step S712, the UI control unit 402 notifies the user of completion of sending of the job information.

If the user gives an instruction to execute a job using a function that is not available for the user through the process of the above flowchart, the user is notified of an error before being requested to enter a PIN code. Accordingly, the user is not required to perform an unnecessary operation. Furthermore, because the process proceeds through remote authentication, determining whether the function is available, and sending job information in response to pressing of the execute button 814 alone, the usability is improved.

Although job execution permission/prohibition information is obtained from the image forming device 104 in the process of the above flowchart, the data processing device 101 may be configured to determine whether a job can be executed. In this case, the data processing device 101 obtains in advance one or more functions that are available for the user from the image forming device 104.

Moreover, although job information is sent in S705 and then whether a job can be executed is determined in S706 in the above flowchart, job execution permission/prohibition information may be obtained before sending job information, and if a job is unexecutable, job information may not be sent. In this case, the data processing device 101 sends user information and information on the function to use to the image forming device 104 before sending job information, and determines whether a job is executable based on a response thereto.

Figure 9:
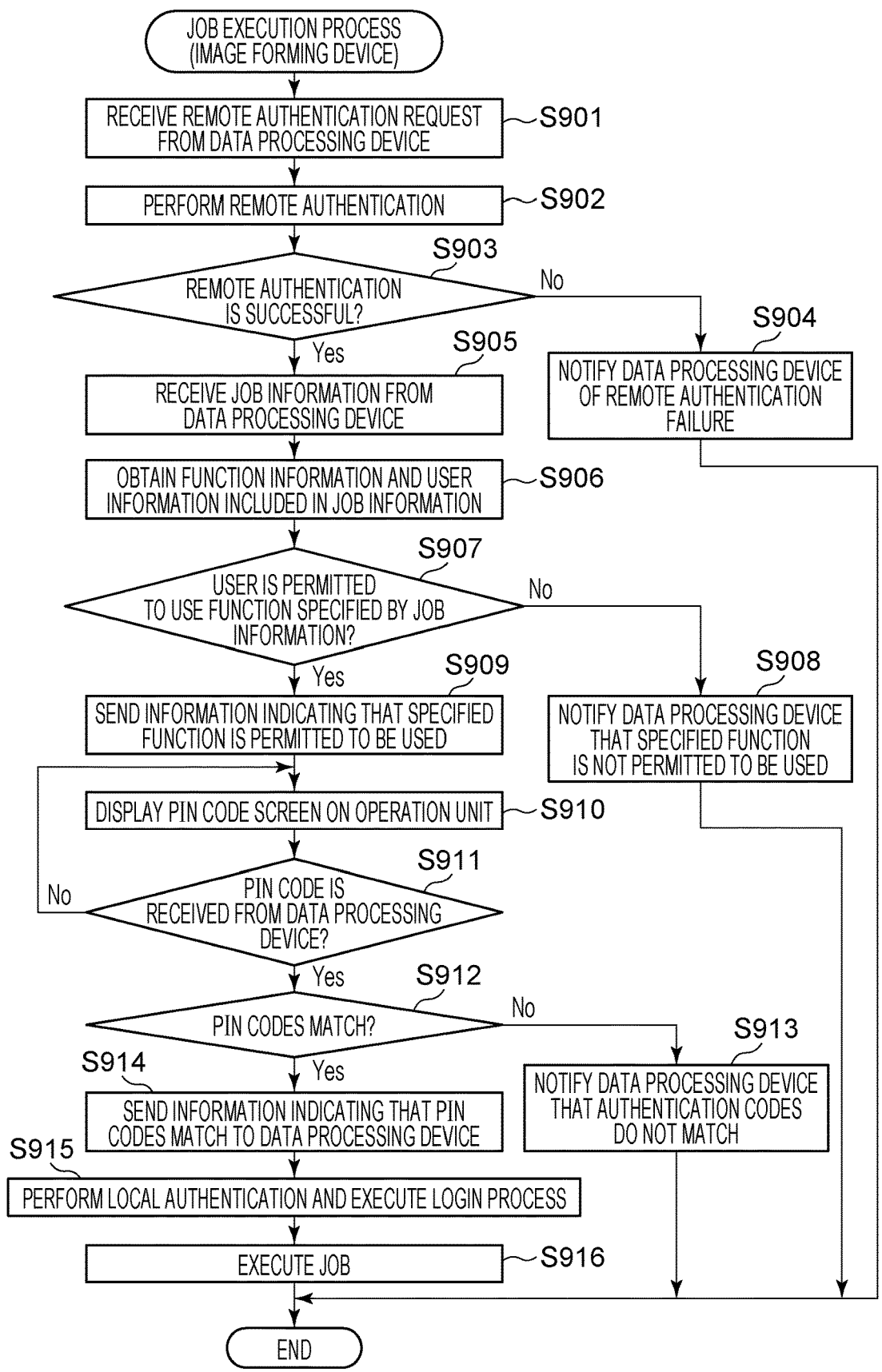
FIG. 9 is a flowchart illustrating a job execution process performed by the image forming device in the first embodiment.

FIG. 9 is a flowchart illustrating a process from when the image forming device 104 receives job information from the data processing device 101 to when the image forming device 104 executes a job, which is realized by reading a program for realizing each control module stored in the ROM 304 or the HDD 305 by the CPU 302 of the image forming device 104 into the RAM 303 and executing the program. Here, an example of sending the "scan and send" job information from the data processing device 101 will be described.

In step S901, the network control unit 505 receives a request for remote authentication that is sent from the data processing device 101 via the network 103. This corresponds to the processing of the data processing device 101 in step S703.

In step S902, the authentication control unit 503 executes remote authentication.

In step S903, the authentication control unit 503 determines whether the remote authentication is successful. If the remote authentication is successful, the process proceeds to step S905, and if not, the process proceeds to step S904 to notify the data processing device 101 of an error. If the remote authentication is successful, it may be configured to not accept instructions from devices other than the data processing device 101 via the network 103.

In step S905, the network control unit 505 notifies the data processing device 101 of the successful remote authentication, and receives job information sent from the data processing device 101 via the network 103.

In step S906, the job control unit 506 obtains specified function information and user information from the job information received in step S905, and stores them in the RAM 303. Although an example in which user information included in job information is obtained is described here, this is not the only possible case, and user information used in the remote authentication may be obtained.

In step S907, the job control unit 506 determines whether a user corresponding to the obtained user information can use the specified function. For example, on receipt of job information including user information of "User B", it is determined that the specified function can be used if the specified function is "copy", and it is determined that the specified function cannot be used if the specified function is "scan and send". These determinations are made based on the usage right management table 1101 of FIG. 11.

In step S908, the job control unit 506 sends a notification that the specified function cannot be used to the data processing device 101 via the network control unit 503, and ends the process.

At this time, the data processing device 101 may display that a function usage restriction is set in the image forming device 104.

In step S909, the job control unit 506 sends information indicating that the specified function can be used to the data processing device 101 via the network control unit 503.

In step S910, the UI control unit 502 displays the PIN code screen 1001 on the operation unit 307.

In step S911, the job control unit 506 determines whether a PIN code sent from the data processing device 101 has been received. If the PIN code has been received, the process proceeds to step S912, and if not, the process returns to step S910.

In step S912, the job control unit 506 determines whether the PIN code sent from the data processing device 101 matches the one displayed on the operation unit 307. If the PIN codes match, the process proceed to step S914. If the PIN codes do not match, the process proceed to step S913, and the job control unit 506 notifies the data processing device 101 via the network 103 that the authentication codes do not match, and ends the process.

In step S914, the job control unit 506 notifies the data processing device 101 via the network 103 that the authentication based on the PIN code is successful.

In step S915, the authentication control unit 503 performs authentication using the user information obtained in step S906, and executes a login process. At this time, the UI control unit 502 may display the home screen 1010 after the login or the "scan and send" setting screen 1020.

In step S916, the job control unit 506 performs job execution based on the job information received in step S905. In the present embodiment, the job information includes scan settings for performing a scan, and a destination to which a scanned image is to be sent by e-mail. Based on this information, a scan is performed, and a scanned image is sent by e-mail to the designated destination.

With the above process, before performing a login process, and furthermore before displaying the PIN code screen 1001, the image forming device 104 determines whether the user who has sent job information has the right to execute a job. Therefore, the user who cannot execute a job is not required to enter a PIN code in the first place. Furthermore, since the user who is not permitted to execute a job is not allowed to log in to the image forming device 104, the operation panel of the image forming device 104 is not occupied unnecessarily.

Although the example of executing the "scan and send" job has been discussed in the present embodiment, this is merely one example, and the present embodiment may be performed in the case of other jobs such as a copy job, a fax job, or a print job. In this case, the user's right to use a function is determined before performing a login process or displaying the PIN code screen 1001.

Although the case where job information is sent from a specific user has been described in the above example, this is not the only possible case, and, in the same manner as in the case where job information is sent from an unspecified user (such as a guest user), a function available for the guest user may be determined and an error may be reported appropriately.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming device comprising:
   a memory; and
   at least one processor in communication with the memory, wherein the at least one processor of the image forming device is configured to perform:
   receiving job information for executing a function of the image forming device from a terminal, the job information including user information;
   before displaying authentication information on a display unit, based on the user information included in the received job information, determining whether a user corresponding to the user information is permitted to use a function specified by the job information;
   based on a determination in the determining that the user is permitted to use the function, displaying the authentication information on the display unit, wherein a screen for prompting an input of the authentication information displayed on the terminal in a case where the user is permitted to use the function;
   in a case where the authentication information inputted by the user on the terminal matches the displayed authentication information, displaying a setting screen of a function corresponding to the job information, wherein the setting screen is not displayed in a case where the authentication information inputted by the user on the terminal does not match the displayed authentication information;

in the case where the authentication information inputted by the user on the terminal matches the displayed authentication information, executing a job based on the job information; and based on a determination in the determining that the user is not permitted to use the function, not displaying the authentication information on the display unit, and notifying the terminal of an error, wherein the screen for prompting the input of the authentication information is not being displayed on the terminal in a case where the user is not permitted to use the function.

2. The image forming device according to claim 1, wherein the at least one processor further performs: logging the user in to the image forming device based on the user information included in the received job information, wherein the login is a login for occupying an operation unit of the image forming device.

3. The image forming device according to claim 1, wherein the at least one processor further performs: configuring settings for restricting one or more functions that are available on a user-by-user basis.

4. The image forming device according to claim 1, wherein the at least one processor performs: on receipt of the job information, displaying a PIN code on the display unit of the image forming device, and in the executing, the job is executed in a case where a PIN code received from the terminal matches the PIN code displayed on the display unit.

5. The image forming device according to claim 1, wherein the job is not executed in response to a determination in the determining that the user is not permitted to use the function.

6. The image forming device according to claim 1, wherein the at least one processor further performs: storing user information and one or more functions that are available for the user in association with each other, and, in the determining, a determination is made based on the stored information.

7. The image forming device according to claim 1, wherein the job is at least one of a job of sending a scanned image, a copy job, a print job, or a fax job.

8. The image forming device according to claim 1, wherein the authentication information is a PIN code.

9. The image forming device according to claim 1, wherein the display unit is a display unit of the image forming device, wherein the inputted authentication information is authentication information inputted on the terminal, and wherein, upon receiving the authentication information inputted on the terminal from the terminal, the image forming device determines whether or not the received authentication information matches the displayed authentication information.

10. The image forming device according to claim 1, wherein the job is processing to transmit an image scanned by the image forming device to a designated destination.

11. The image forming device according to claim 1, wherein the at least one processor performs:

login processing using the user information included in the received job information when the inputted authentication information matches the displayed authentication information.

12. The image forming device according to claim 1, wherein the at least one processor performs:

control not to perform login processing using the user information included in the received job information in a case where the inputted authentication information does not match the displayed authentication information.

13. The image forming device according to claim 1, wherein, in a case where the authentication information inputted by the user with the terminal matches the displayed authentication information, the at least one processor is configured to display on the display unit a home screen after a login and the setting screen for the function.

14. The image forming device according to claim 1, wherein the determination is performed before login processing is performed using the user information included in the received job information, wherein the login processing is login processing for occupying an operation panel of the image forming device.

15. The image forming device according to claim 1, wherein information that indicates a use permission is transmitted to the terminal in a case where the user is determined to be permitted to use the function, and information that indicates an authentication information match is transmitted to the terminal in the case where the authentication information inputted by the user on the terminal matches the displayed authentication information.

16. A system including an image forming device and a terminal, the system comprising one or more processors configured to perform:

sending job information for executing a function of the image forming device to the image forming device, the job information including user information;

before displaying authentication information on a display unit, based on the user information included in the sent job information, determining whether a user corresponding to the user information is permitted to use a function specified by the job information;

based on a determination in the determining that the user is permitted to use the function, displaying the authentication information on the display unit, wherein a screen for prompting an input of the authentication information displayed on the terminal in a case where the user is permitted to use the function;

in a case where the authentication information inputted by the user on the terminal matches the displayed authentication information, displaying a setting screen of a function corresponding to the job information, wherein the setting screen is not displayed in a case where the authentication information inputted by the user on the terminal does not match the displayed authentication information;

in the case where the authentication information inputted by the user on the terminal matches the displayed authentication information, executing a job based on the job information; and based on a determination in the determining that the user is not permitted to use the function, not displaying the authentication information on the display unit, and reporting an error, wherein the screen for prompting the input of the authentication information is not displayed on the terminal in a case where the user is not permitted to use the function.

17. The system according to claim 16, further comprising: based on the user information included in the sent job information, logging the user in to the image forming device.

18. The system according to claim 16, further comprising: configuring settings for restricting one or more functions that are available on a user-by-user basis.

19. The system according to claim 16, wherein the terminal can save job information and invoke the saved job information in response to a user operation.

20. A method for an image forming device, the method comprising:
- receiving job information for executing a function of the image forming device from a terminal, the job information including user information;
- before displaying authentication information on a display unit, based on the user information included in the received job information, determining whether a user corresponding to the user information is permitted to use a function specified by the job information;
- based on a determination in the determining that the user is permitted to use the function, displaying the authentication information on the display unit, wherein a screen for prompting an input of the authentication information displayed on the terminal in a case where the user is permitted to use the function;
- in a case where the authentication information inputted by the user on the terminal matches the displayed authentication information, displaying a setting screen of a function corresponding to the job information, wherein the setting screen is not displayed in a case where the authentication information inputted by the user on the terminal does not match the displayed authentication information;
- in the case where the authentication information inputted by the user on the terminal matches the displayed authentication information, executing a job based on the job information; and
- based on a determination in the determining that the user is not permitted to use the function, not displaying the authentication information on the display unit, and notifying the terminal of an error, wherein the screen for prompting the input of the authentication information is not displayed on the terminal in a case where the user is not permitted to use the function.

* * * * *